(12) United States Patent
Conway et al.

(10) Patent No.: US 7,190,908 B2
(45) Date of Patent: Mar. 13, 2007

(54) OPTICAL DIFFERENTIAL QUADRATURE PHASE-SHIFT KEYED DECODER

(75) Inventors: Joshua A. Conway, Palos Verdes Estates, CA (US); Grant S. Williams, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 641 days.

(21) Appl. No.: 10/281,676

(22) Filed: Oct. 28, 2002

(65) Prior Publication Data
US 2004/0081469 A1 Apr. 29, 2004

(51) Int. Cl.
*H04B 10/04* (2006.01)
(52) U.S. Cl. .............. 398/188; 398/201; 398/212
(58) Field of Classification Search ........ 398/155–163, 398/182–201, 211–214
See application file for complete search history.

(56) References Cited

U.S. PATENT DOCUMENTS

| | | | |
|---|---|---|---|
| 6,172,632 B1* | 1/2001 | Carter, IV | 341/147 |
| 6,282,236 B1* | 8/2001 | Carter, IV | 375/222 |
| 2003/0175037 A1* | 9/2003 | Kimmitt et al. | 398/198 |
| 2004/0081470 A1* | 4/2004 | Griffin | 398/188 |

* cited by examiner

*Primary Examiner*—Dzung Tran
(74) *Attorney, Agent, or Firm*—Ostrager, Chong Flaherty & Broitman P.C.

(57) ABSTRACT

A differential quadrature phase shift keyed system includes a fiber optic source and a first fiber optic differential phase shift keyed demodulator coupled to the fiber optic source having a first phase differential. A second fiber optic differential phase shift keyed demodulator is coupled to the fiber optic source disposed parallel with the first fiber optic differential phase shift key demodulator. The second demodulator has a second phase shift differential equal to the first phase differential plus about 90 degrees.

19 Claims, 3 Drawing Sheets

OPTICAL DIFFERENTIAL QUADRATURE PHASE-SHIFT KEYED DECODER

TECHNICAL FIELD

The present invention relates generally to inter-satellite communication, and more particularly to an optical keyed decoder.

BACKGROUND ART

Double-hop transmission is a condition where two ground stations may indirectly communicate with each other with the assistance of an intermediate ground station. A double-hop satellite link typically arises where two ground stations are sufficiently remote from each other that they do not have a direct link to the same satellite. As a result, the signal travels through space twice.

In particular, a transmitting ground station sends the signal through a first satellite to the intermediate ground station. Then, the intermediate ground station sends the signal through a second satellite to a recipient ground station.

Several disadvantages of double-hop satellite links are known. Double-hop satellite links double the satellite delay normally attributed to direct satellite links. Also, double-hop transmission is known for producing an inconvenient delay in sound for video conferencing. In this regard, a user may see parts of a video transmission before the associated sound is played. Furthermore, service costs may be doubled and security problems may arise with the use of an additional satellite and an additional ground station.

One way to reduce double hop delays is to provide an inter-satellite link to allow for secure, high capacity communication channels around the world. One problem with inter-satellite links is that the transmitter power is relatively high. In satellite communications, reducing the power consumption by the various components is typically a goal. One way in which to reduce output power by fifty percent is to employ an encoding scheme known as differential phase shift keying (DPSK). Differential phase shift keying requires a demodulator on the receiver to translate the received data from optical phase encoding to standard logical zeroes and ones. In DPSK, each bit is compared with the previous bit and, if the bit differs from the previous, a phase change of 180 degrees is placed on the optical carrier. If the bit is the same, no change in phase is made. DPSK has an advantage over regular phase shift keying in that there is no need for a local oscillator or phase reference. An optical system, employing a local oscillator as a reference, is a complex, non-trivial problem that is extremely difficult to implement.

Quadrature phase shift keying (QPSK) modulation is a standard format commonly implemented in RF communications. However, due to the short wavelengths inherent in optical communications, phase modulation is generally not used. Most fiber-optic links employ on-off keying and typically ignore phase shift keying. This is due to the tight tolerances imposed by the high frequency of the carrier.

Quadrature phase shift keying allows a doubling of the data throughput without an increase of clock speed. QPSK modulation has four symbols rather than two found in typical binary communications. The four symbols are represented by four distinct phase shifts, each separated by ninety degrees (0°, 90°, 180°, and 270°). In QPSK, each transmitted symbol represents two bits of data (00, 10, 11, or 10). Thus, the actual data rate is double the clock rate. Differential QPSK (D-QPSK) is similar to traditional DPSK in that it compares previous bits with present bits to achieve encoding. No such implementation in the optical industry is known.

It would therefore be desirable to provide a system that increases a throughput of an optical system to make inter-satellite links more viable.

SUMMARY OF THE INVENTION

The present invention provides a decoder that is suitable for use in a differential quadrature phase shift keying system.

In one aspect of the invention, a differential quadrature phase shift keyed system includes a fiber optic source and a first fiber optic differential phase shift keyed demodulator coupled to the fiber optic source having a first phase differential. A second fiber optic differential phase shift keyed demodulator is coupled to the fiber optic source disposed parallel with the first fiber optic differential phase shift key demodulator. The second demodulator has a second phase shift differential equal to the first phase differential plus about 90 degrees.

In a further aspect of the invention, a method for decoding an optical signal comprises dividing an optical signal having a plurality of symbols having a symbol time into a first path, a second path, a third path and a fourth path; providing a first delay in the first path of one symbol time; providing a third delay in the third path of one symbol plus a ninety degree phase delay; coupling the first path and second path to form a first output and a second output; coupling the third and fourth signal path to form a third output and a fourth output; comparing the first output and the second output to form a first electrical signal; comparing said third output and the fourth output to form a second electrical signal; and, determining a phase delay in response to the first electrical signal and the second electrical signal.

One advantage of the invention is that heterodyne detection that requires a local oscillator being mixed with the signal is not performed. Local oscillators and the beat frequencies associated with heterodyne detection are not present in the present invention. The present invention allows direct detection, which is simpler than heterodyne detection.

Other aspects and advantages of the present invention will become apparent upon the following detailed description and appended claims, and upon reference to the accompanying drawings.

BEST MODES FOR CARRYING OUT THE INVENTION

Figure 1:
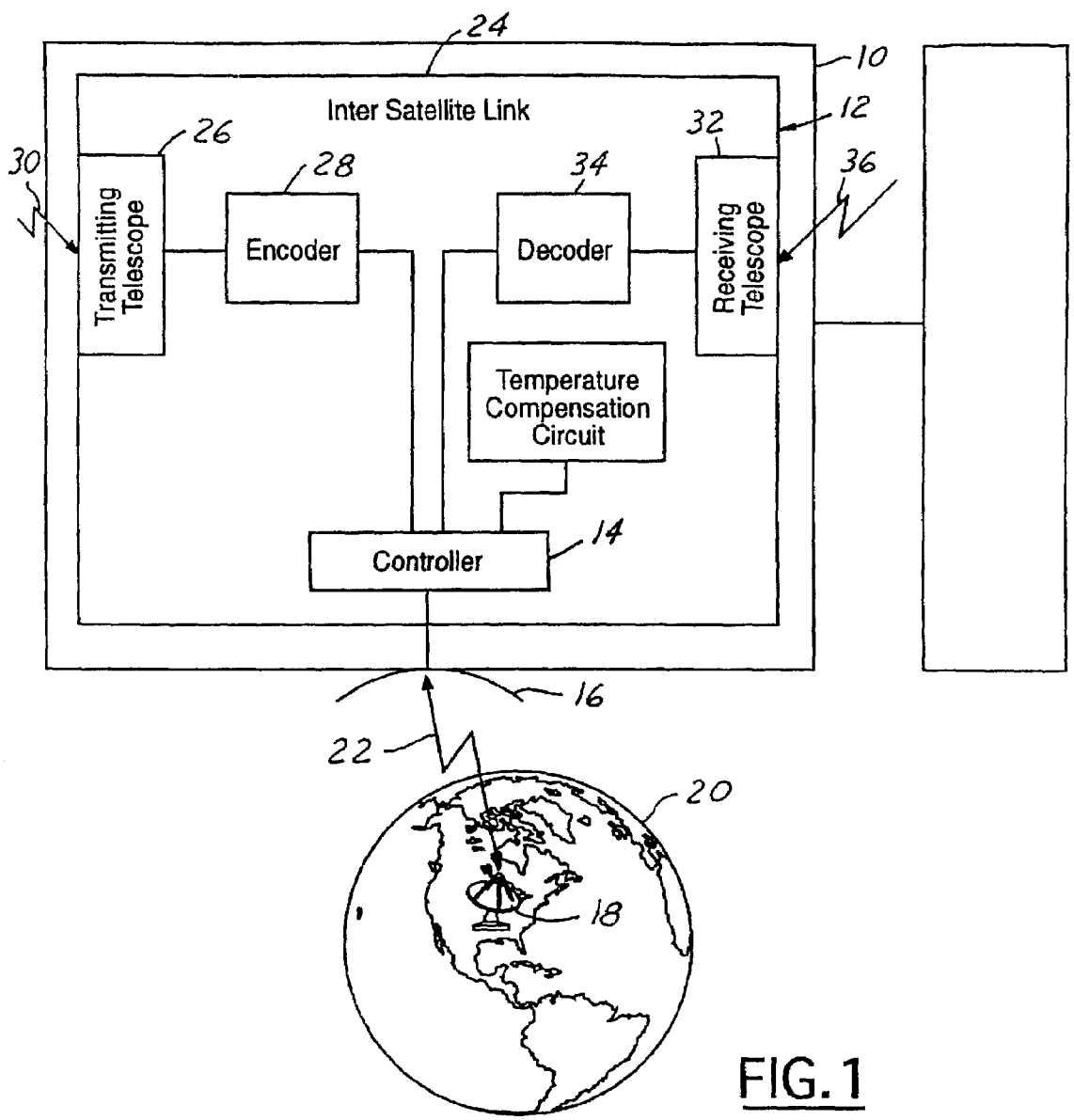
FIG. 1 is a high level block diagrammatic view of a satellite formed according to the present invention.

In the following figures the same reference numerals will be used to illustrate the same components in the various views.

The present invention is described and illustrated with respect to a satellite-based interferometer system used in a decoder for differential quadrature phase shift keying. As those skilled in the art will recognize, aspects of the invention may be employed in terrestrial optical fiber systems including the decoder and the length compensation circuit. Other types of systems besides an interferometer may benefit from the length compensation circuit.

Referring now to FIG. 1, a satellite 10 having an optical system 12 formed according to the present invention is illustrated. Optical system 12 is coupled to a controller 14 which may be part of a central control system for the satellite 10. Controller 14 may, for example, be part of the telemetry command and control system of the satellite 10. Controller 14 may, for example, communicate with an antenna 16 that is used to send and receive RF signal to a ground station or users 18 on earth 20 using communication signal 22. Controller 14 is preferably microprocessor-based. Although only one controller 14 is illustrated, several controllers may be required to perform all the various functions. For simplicity only one is illustrated.

Optical system 12 includes an inter-satellite link (ISL) 24 that is used to transmit optical signals to another satellite and receive optical signals from another satellite. Inter-satellite link 24 includes a transmitting telescope 26 and an encoder 28 coupled thereto for transmitting optical signal 32 to an adjacent satellite. A receiving telescope 32 is coupled to a decoder 34, which is used to receive optical signals 36 from an adjacent satellite. Decoder 34 converts the optical signals 36 to binary digital electrical signals. Controller 14 is coupled to both encoder 28 and decoder 34 which among other things may control the communication of the encoder 28, decoder 34 and RF communications through antenna 16.

Figure 2:
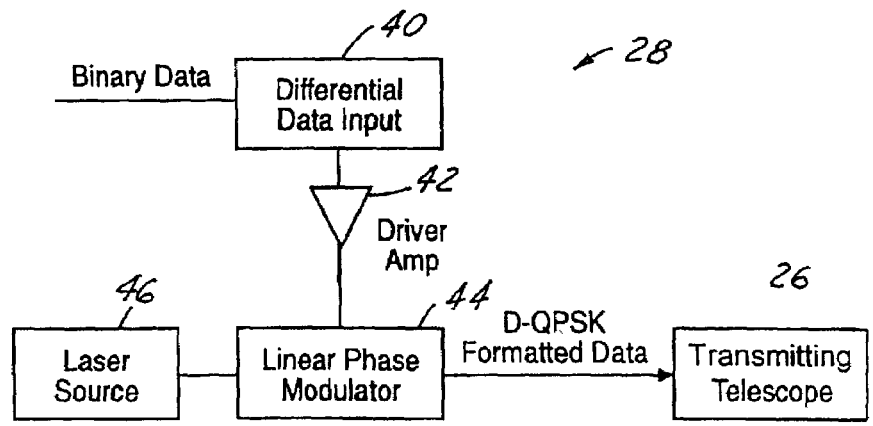
FIG. 2 is a block diagrammatic schematic view of a differential quadrature phase shift keyed encoder according to the present invention.

Referring now to FIG. 2, encoder 28 is illustrated in further detail. Encoder 28 has a differential data input 40 that receives binary data from a source such as controller 14. Differential data input 40 converts the binary data to differential data at a clock rate at half the data rate. The differential signal is provided to a driver amplifier 42 that imparts the appropriate phase shift onto an optical carrier. The signal from the driver amplifier 42 is provided to linear phase modulator 44. Linear phase modulator 44 is coupled to a laser source 46. Linear phase modulator 44 may, for example, be formed of lithium niobate. Driver amplifier 42 provides one of four voltages: zero, $V_{\pi/2}$, $V_{\pi}$, and $V_{3\pi/2}$ to achieve the appropriate phase shift in the optical carrier. Phase modulator 44 may work at high clock rates such as 10 GHz. Because the driver amplifier outputs four different voltages, the linear phase modulator 44 generates differential quadrature phase shift keyed data formatted in optical format that is transmitted through the transmitting telescope 26 to another satellite. It should be noted that the binary data received by differential data input 40 may be received from the decoder 34 or antenna 16.

Figure 3:
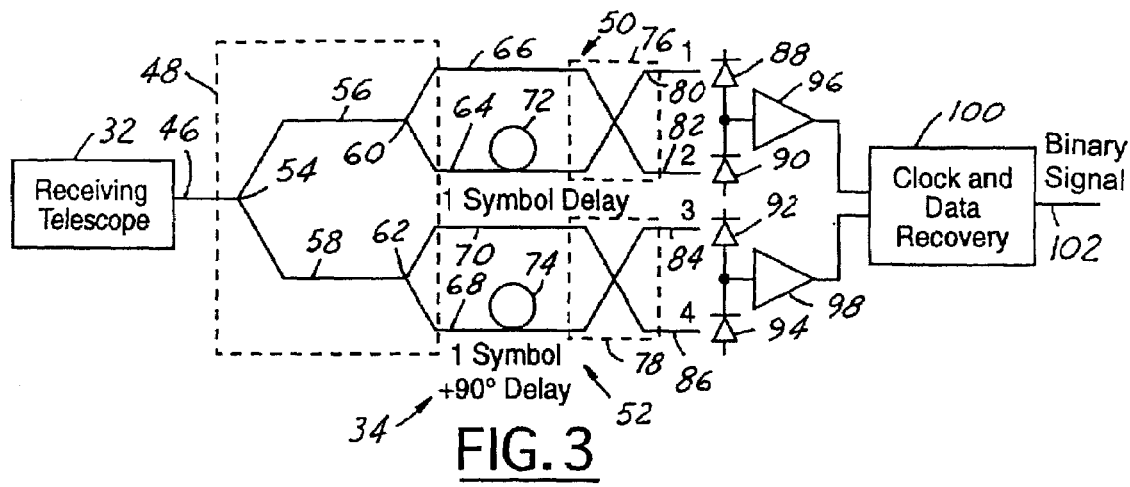
FIG. 3 is a schematic view of a differential quadrature phase shift keyed decoder formed according to the present invention.

Referring now to FIG. 3, decoder 34 is illustrated in further detail. Decoder 34 is coupled to receiving telescope 32 that provides an optical signal source. The optical signals are coupled to receiving optical fiber 46. The received optical signals are a sequential series of symbols that each have an associated symbol time or length. Receiving optical fiber 46 is coupled to a beam splitter 48 that is used to split the power of the receiving optical fiber between a first differential phase shift keyed demodulator 50 and a second differential phase shift keyed demodulator 52. Beam splitter 48 may, for example, comprise a first splitter portion 54 that divides the power evenly between an upper arm 56 and a lower arm 58, a third splitter portion 60 that divides the upper arm 56 and a fourth splitter portion 62 that divides the optical signals in lower arm 68. The optical signal is divided by splitter portion 60 into a first optical fiber 64 having a first optical signal therein. Splitter portion 62 divides lower arm 58 into a second optical fiber 66 having a second optical signal therein, a third optical fiber 68 having a third optical fiber therein, and a fourth optical fiber 70 having a fourth optical signal therein. Each splitter portion 54, 60, 62 is preferably a 50:50 splitter that divides the power equally between both of its branches. Thus, the power of the first optical signal, the second optical signal, the third optical signal, and the fourth optical signal are preferably equal within the limitations of a splitter.

The first optical fiber 64 has a delay portion 72 therein. The optical signal received at the receiving optical fiber has a sequence of symbols having a symbol time that are transmitted through the optical fibers. Delay portion 72 is equal to a delay of about the length of one symbol.

Third optical fiber 68 also has a delay portion 74. Delay portion 74 is equal to one symbol delay like that of delay portion 72 with an additional 90 degree phase delay. Both the delay portions 72, 74 may be implemented by increasing the length of the optical fiber. As illustrated, the increased length is shown as a loop.

First optical fiber 64 and second optical fiber 66 are coupled together through a coupler 76 to form a first output 80 and a second output 82. The output optical signal at 80 is thus an interference of the second optical signal on the first optical signal. The optical signal at output 82 is the interference of first optical signal on the second optical signal. Thus, if the first symbol in the optical signal has the same phase as the second symbol, the light will interfere constructively and add as a strong signal at output 80 in arm 64. At output 82 a minimal amount of power will be present. If the first symbol is 180 degrees out of phase with the second, the light will interfere constructively at output 82 causing a strong optical signal thereon and weak optical signal at output 80.

A second coupler 78 couples optical fibers 68 and 70 in a similar manner to that of coupler 76. That is, the outputs 84, 86 are interferences of the third and fourth optical signals. However, when the signals are 90 degrees out of phase output 84 is strong and output 86 is weak, and when the output 84 is weak and output 86 is strong a 270 degrees phase shift is present. When a strong and weak signal is present at either 80 and 82 or 84 and 86, intermediate signals are present at the other outputs 80, 82 of demodulators 50, 52.

The optical outputs 80, 82, 84, and 86 are each coupled to a respective detector 88, 90, 92, and 94. Each detector detects the optical signal and converts the power of the optical signals to a corresponding electrical signal having a corresponding "electrical" power. Detectors 88, 90, 92, and 94 are each illustrated as diodes. Detectors 88 and 90 are coupled to a first trans-impedance amplifier (TIA) 96. Detectors 92 and 94 are coupled to a second trans-impedance amplifier 98. When the outputs 80, 82 and corresponding detector signals 88 and 90 detect zero degrees or 180 degrees input phase difference, the output of trans-impedance amplifier 96 is ±1 in arbitrary units while the output of trans-impedance amplifier 98 is zero. Likewise, when the outputs 84 and 86 as detected by detectors 92 and 94 indicate either a 90 degrees or 270 degrees phase difference, the upper trans-impedance amplifier 96 will have an output of zero while the lower trans-impedance amplifier will be ±1 in arbitrary units. The outputs of trans-impedance amplifiers 96, 98 are provided to a clock and data recovery circuit 100 which outputs a binary signal 102 that corresponds electrically and digitally to the input optical signal. Clock and data circuit 102 puts the output in binary sequential digital form.

Figure 4:
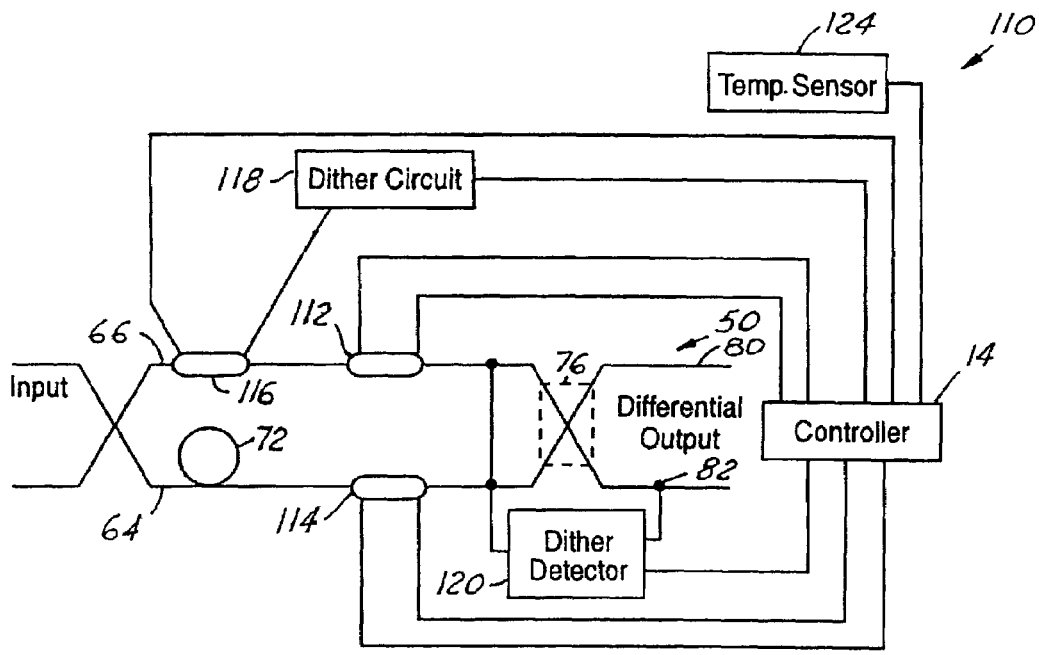
FIG. 4 is a diagrammatic schematic view of an interferometer having length compensation according to the present invention.

Referring now to FIG. 4, the above-mentioned interferometers 50 and 52 are sensitive to heating. One arm is shorter than the other arm due to the delay lines therein. FIG. 4 illustrates demodulator 50 with a compensation portion 110. Second optical fiber 66 is the short fiber and first optical fiber 64 is the long optical fiber due to the increased length provided by delay portion 72. The thermal properties of the optical fibers have the same coefficient of thermal expansion. However, the long optical fiber because of its increased length will expand by an overall longer length due to the increased length of the fiber. A heater 112 may be coupled to second optical fiber 66. A heater 114 is coupled to first optical fiber 64. A second heater such as a dither heater 116 may be coupled to optical fiber 66. Dither heater 116 may include a dither circuit 118. Heaters 112, 114, and 116 as well as dither circuit 118 are coupled to controller 14. By controlling the heaters as described below, the length of each of the optical fibers may be controlled. At minimum, heaters 112 and 114 may be provided. A dither detector 120 may be coupled between optical fiber 66 and output 82.

Figure 5:
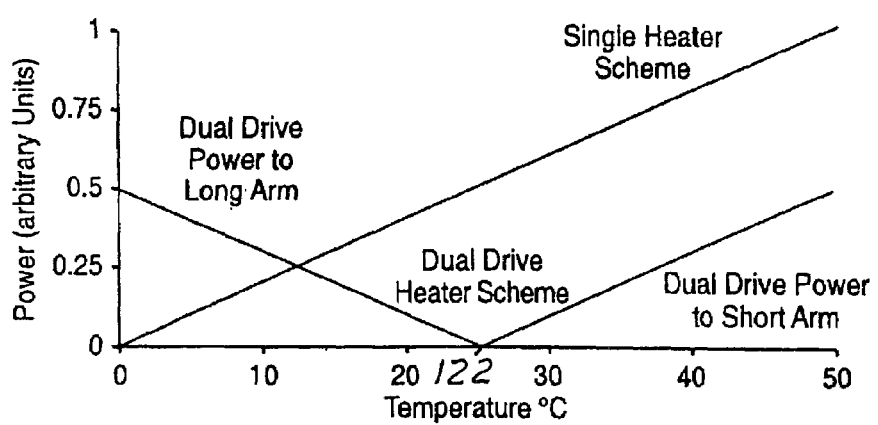
FIG. 5 is a plot of temperature versus power dissipated by the temperature compensation circuit according to the present invention.

Referring now also to FIG. 5, a comparison of the dual drive heater scheme in comparison with a single heater scheme is illustrated. In temperatures below a predetermined temperature, the long arm 64 is heated using heater 114. In temperatures above the predetermined temperature 122, the short arm 66 is heated using heaters 112 and possibly heater 116. The predetermined temperature is a design choice at which the system has a relative length.

A temperature sensor 124 is used to monitor the temperature to provide compensation through controller 114 through heaters 112 and 114. In typical applications temperature sensor 124 may not be sensitive or accurate enough to operate satisfactorily in an optical environment. Therefore, dither circuit 118 and dither detector 120 may be used to monitor the difference in the temperature. Dither circuit 118 imparts a small sinusoidal dither signal on short arm 66. The dither signal is a low frequency signal such as 93 Hz that can be sensed by dither detector 120. The sinusoidal output causes a variation in the interferometer output, which can be locked onto by dither detector 120.

Figure 6:
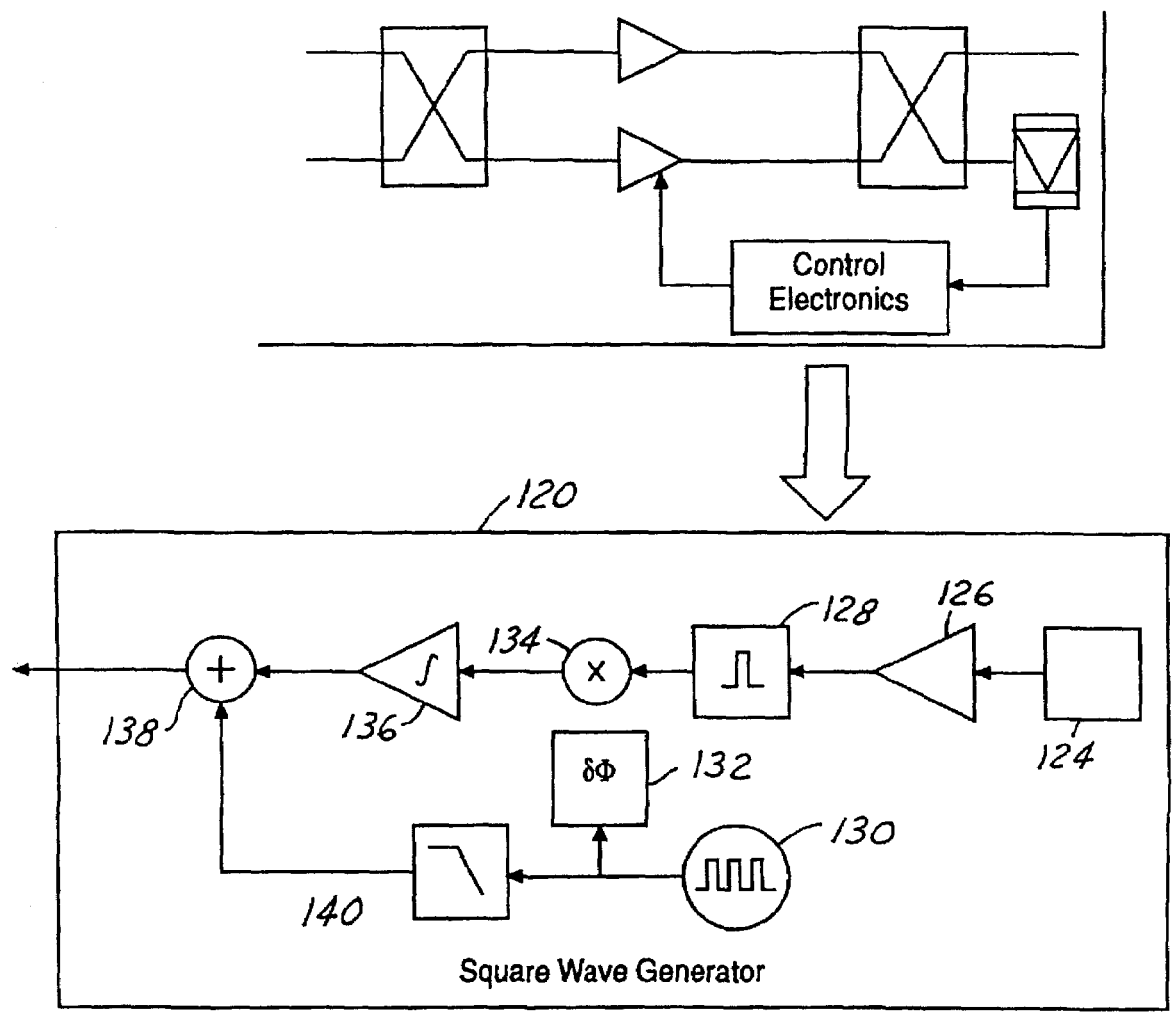
FIG. 6 is a schematic view of a dither detection circuit that may be used to detect a difference in temperature according to the present invention.

Referring now to FIG. 6, dither detector 120 is illustrated in further detail. Dither detector 120 as mentioned above, is coupled between optical fiber 66 and output 82. Dither detector 120 includes a dither cap coupler 124 that is used to tap a portion of output 82. A preamplifier 126 may also be employed to amplify the signal. Preamplifier 126 is an optional component. A bandpass filter 128 is connected to dither tap coupler 124 and receives the secondary amplified signal therefrom. Bandpass filter 128 allows a filtered signal having its entire frequency to pass therethrough and reject noise. In this regard, dither detector 120 permits only one frequency to pass therethrough. This frequency corresponds to the frequency imparted thereon by dither circuit 118. Dither detector 120 may also include a square wave generator 130, which produces a first sinusoidal signal at a frequency equal to the filtered signal passing through the bandpass filter 128. A phase modulator 132 is coupled to the square wave generator 130 and receives a first sinusoidal wave therefrom. Phase modulator 132 aligns the filter signal with the first sinusoidal signal. A mixer 134 is coupled to bandpass filter 128 and phase modulator 132. Mixer 134 receives the filtered signal from the bandpass filter 128 and the first sinusoidal signal from the phase modulator 132. Mixer 134 multiplies the filtered signal by the sinusoidal signal at the same frequency and the same phase so as to produce a composite signal. An integrator 136 is coupled to mixer 134 and receives the composite signal therefrom. Integrator 135 produces an average DC output based on the composite signal. A summer 138 is coupled to integrator 136 and receives the average DC output therefrom. Furthermore, the summer 138 is coupled to a low pass filter 140 for receiving a second sinusoidal signal produced by the square wave generator 130. The second sinusoidal signal passes from the square wave generator 130 through the low pass filter 140 to summer 138. Summer 138 adds the second sinusoidal signal from the square wave generator 130 and the average DC output from integrator 136 to produce a dither output. Thus, as can be seen, as the fundamental frequency of dither circuit 118 is no longer detected, the amount of heating to be applied can thus be adjusted accordingly. Thus, when the component of the output of the dither frequency has been reduced to zero, lockin has been achieved and thus the length of the two arms are aligned in phase. Thus, the correct interference signal is generator at the output of the optical signal. As the dither frequency varies greater than or less than zero, appropriate adjustments can be made to the amount of heat applied by the heaters.

Figure 7:
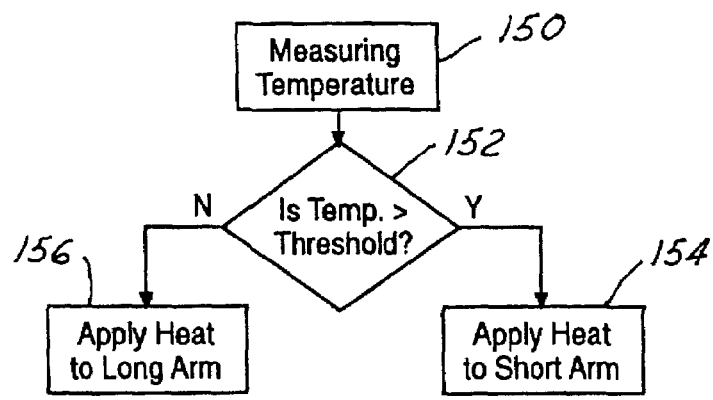
FIG. 7 is a high level flow chart of the method of length compensation according to the present invention.

Referring now to FIG. 7, the operation of the controller 14 is described in further detail. Referring now to step 150, a temperature change is measured or determined. The change in temperature may be made directly or indirectly. As mentioned above, a direct measurement may be made by a temperature sensor. An indirect temperature change may be measured by the dither detection circuit in response to a dither signal added to one of the optical fibers of the interferometer. When the temperature is greater than a predetermined threshold in step 152, step 154 is executed in which heat is applied to the short arm of the interferometer. In step 152, if the temperature is not greater than the threshold, heat is applied to the long arm in step 156. It should be noted that the dither heater 116 may also be controlled together with heater 112. By controlling the length of the optical fibers, the phase difference may be maintained in response to the various temperature conditions. It should be noted that the temperature compensation may be applied to various types of optical devices sensitive to length changes not limited to interferometers. It should also be noted that when one of the above heaters is operating the other heater is not operating or the operation of the other heater is discontinued.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. An optical decoder comprising:
 a fiber optic source having a source signal having a symbol time;
 a first fiber optic differential phase shift keyed demodulator coupled to the fiber optic source and having a first phase differential, the first demodulator comprising first and second optical fibers;

a second fiber optic differential phase shift keyed demodulator coupled to the fiber optic source, disposed parallel with the first fiber optic differential phase shift keyed demodulator and having a second phase differential equal to said first phase differential plus about ninety degrees;

a first heater coupled to the first optical fiber; and first dither means for controlling the first heater to control the length of the first optical fiber.

2. An optical decoder as recited in claim 1 further comprising a splitter dividing the fiber optic source into the first optical fiber, the second optical fiber, a third optical fiber and a four optical fiber having a respective first optical signal, a second optical signal, a third optical signal and a fourth optical signal.

3. An optical decoder as recited in claim 2 further comprising a plurality of detectors coupled to the first and second demodulators for generating electrical signals corresponding to a first optical output of the first demodulator and a second optical output of the second demodulator.

4. An optical decoder as recited in claim 3 further comprising a transimpedance amplifier coupled to the detectors generating a digital signal in response to the electrical signals.

5. An optical decoder as recited in claim 3 wherein the first optical output is a first interference of the second optical signal on the first optical signal.

6. An optical decoder as recited in claim 5 wherein a second optical output is a second interference of the first optical signal on the second optical signal.

7. An optical decoder as recited in claim 1 wherein the first optical fiber comprises a first delay portion having the first phase differential.

8. An optical decoder as recited in claim 7 wherein the first phase differential comprises the symbol time.

9. An optical decoder as recited in claim 7 wherein the second demodulator comprises third and fourth optical fibers.

10. An optical decoder as recited in claim 9 wherein the third optical fiber comprises a second delay portion having the first phase differential plus about ninety degrees.

11. An optical decoder as recited in claim 9 further comprising a second heater coupled to the third optical fiber; and second dither means for controlling the second heater to control the length of the third optical fiber.

12. An optical decoder as recited in claim 1 wherein said first and second demodulators form a differential quadrature phase shift keyed device.

13. An optical decoder as recited in claim 1 wherein the first dither means comprise a dither circuit and a dither detector, the dither detector comprising a dither cap coupler, a bandpass filter, a mixer, an integrator and a summer coupled in series, a square wave generator, a phase modulator coupling the output of the square wave generator to the mixer, and a low pass filter coupling the output of the square wave generator to the summer.

14. An inter-satellite link comprising an encoder, a transmitting telescope coupled to the encoder, a decoder, a receiving telescope coupled to the decoder, and a controller for controlling the encoder and the decoder, wherein the decoder comprises:

a fiber optic source having a source signal having a symbol time;

a first fiber optic differential phase shift keyed demodulator coupled to the fiber optic source and having a first phase differential, the first demodulator comprising first and second optical fibers;

a second fiber optic differential phase shift keyed demodulator coupled to the fiber optic source, disposed parallel with the first fiber optic differential phase shift keyed demodulator and having a second phase differential equal to said first phase differential plus about ninety degrees;

a first heater coupled to the first optical fiber; and first dither means for controlling the first heater to control the length of the first optical fiber.

15. The inter-satellite link as recited in claim 14 wherein the second demodulator comprises third and fourth optical fibers.

16. The inter-satellite link as recited in claim 15 further comprising a second heater coupled to the third optical fiber; and second dither means for controlling the second heater to control the length of the third optical fiber.

17. The inter-satellite link as recited in claim 14 wherein said first and second demodulators form a differential quadrature phase shift keyed device.

18. The inter-satellite link as recited in claim 17 wherein the first dither means comprise a dither circuit coupled to the controller and a dither detector coupled to the controller.

19. The inter-satellite link as recited in claim 18 wherein the dither detector comprises a dither cap coupler, a bandpass filter, a mixer, an integrator and a summer coupled in series, a square wave generator, a phase modulator coupling the output of the square wave generator to the mixer, and a low pass filter coupling the output of the square wave generator to the summer.

* * * * *